United States Patent [19]

Paar et al.

[11] Patent Number: 4,550,146
[45] Date of Patent: Oct. 29, 1985

[54] PAINT BINDERS CARRYING OXAZOLIDINE GROUPS AND PROCESS FOR PRODUCING SUCH BINDERS

[75] Inventors: Willibald Paar; Helmut Hönig, both of Graz, Austria

[73] Assignee: Vianova Kunstharz, A.G., Werndorf, Austria

[21] Appl. No.: 683,361

[22] Filed: Dec. 19, 1984

[30] Foreign Application Priority Data

Dec. 19, 1983 [AT] Austria .................................. 4408/83

[51] Int. Cl.$^4$ ............................................. C08G 59/14
[52] U.S. Cl. .................. 525/327.3; 523/414; 204/181.7; 525/375; 525/501.5; 525/504; 525/533; 528/111; 528/111.5; 528/113; 528/327; 528/341
[58] Field of Search ...................... 528/111, 111.5, 113, 528/327, 341; 525/533, 327.3, 375, 501.5, 504

[56] References Cited

U.S. PATENT DOCUMENTS 3,951,916  4/1976  Sausaman ............................ 528/88
4,327,200  4/1982  Leitner et al. .................. 528/111 X
4,431,781  2/1984  Paar ................................. 528/111 X
4,480,083  10/1984  Tortorello et al. ................. 528/111

Primary Examiner—Earl Nielsen
Attorney, Agent, or Firm—A. W. Breiner

[57] ABSTRACT

Process for producing cationic epoxy resins carrying oxazolidine groups suitable as paint binders, and particularly paint binders for the formulation of cathodically depositable paints, wherein the epoxy resin is reacted with a hydroxy functional oxazolidine compound or with an oxazolidine compound carrying in the ring the structure

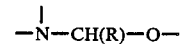

in the presence of a monocarboxy compound. The presence of the monocarboxy compound permits the direct reaction or linkage of the epoxy resin with the oxazolidine compound without gelation; and, additionally, the monocarboxy compound favorably influences the film-forming characteristics of the binders.

14 Claims, No Drawings

PAINT BINDERS CARRYING OXAZOLIDINE GROUPS AND PROCESS FOR PRODUCING SUCH BINDERS

FIELD OF INVENTION AND BACKGROUND

This invention is directed to a process for producing cationic epoxy resins carrying oxazolidine groups suitable for use as paint binders, particularly for the formulation of cathodically depositable paints (CED-paints), to the paint binders produced, and to paints utilizing the binders.

Various methods are known, as disclosed in EP-B1-00 28 401, EP-B1-00 28 402, EP-A2-96 768 and AT-PSS Nos. 375 952, 374 816, 375 946 and 376 231, for producing oxazolidine group carrying compounds and for reacting the compounds as semiesters or monourethanes formed through-reaction with dicarboxylic acid anhydrides or with diisocyanates with epoxy resins either via the hydroxy groups or functional groups of the ring. Through the introduction of such basic groups the solubility of binder materials at a relatively low degree of neutralization can be essentially improved. Furthermore, due to the great variety of possible substituents, the paint and film properties can be tailored for particular applications. However, heretofore it was not possible to obtain binders, water dilutable upon neutralization, by direct addition of such hydroxy or ring functional oxazolidine compounds to epoxy resins, since such compounds immediately led to a crosslinking of the epoxy resins and, thus, to gelling of the reaction batch. [As used herein, the term "ring functional oxazolidine compounds" is understood to embrace five-membered ring systems carrying the structure

wherein R is H or an alkyl or aryl radical without alcoholic hydroxy functionality. The preparation of compounds of this type is described in AT-PS No. 375 946.] A direct addition of the reaction partners is, however, desirable for water-dilutable binders since, on the one hand, the number of saponifiable ester linkages is reduced; and, on the other hand, working with isocyanates and the preparation of intermediates can be avoided.

SUMMARY AND OBJECTS OF INVENTION

Surprisingly, it has now been found that the direct addition or linking of hydroxy or ring functional oxazolidine compounds to epoxy resins is possible if the reaction is carried out in the presence of monocarboxy compounds. Optionally, the reaction with additional amine compounds can be carried out simultaneously, providing a further simplification of the process. Accordingly, a primary object of the present invention is to provide a process for producing oxazolidine group carrying cationic epoxy resins suitable as paint binders, particularly for the formulation of cathodically depositable paints characterized in that an epoxy resin is reacted at from about 65°–90° C. with a hydroxy functional oxazolidine compound or with an oxazolidine compound carrying in the ring the structure

wherein R is H or an alkyl or aryl radical without alcoholic hydroxy groups in the presence of a monocarboxy compound and preferably an additional amine compound, the weight ratio between oxazolidine compound and monocarboxy compound lying between 1:5 and 2:1, the mole-sum of the epoxy reactive groups corresponding to the mole-sum of the epoxy groups of the epoxy resin, and at least about 30% of the basic components having an oxazolidine structure with an amine number of at least about 35 mg KOH/g, and preferably of 40 to 120 mg KOH/g. [As used herein, the term "epoxy reactive groups" is understood to embrace the carboxy groups of the monocarboxylic compound, the secondary and primary amino groups of amine compounds, and the oxazolidine groups of the components employed.]

In order to obtain binders with satisfactory water dilutability upon partial neutralization, the weight ratios should range within the following limits, calculated on 1 epoxy equivalent (or 1 mole epoxy groups):

oxazolidine compound: 0.1–0.8 moles, and preferably 0.2–0.5 moles;

monocarboxy compound: 0.2–0.8 moles, and preferably 0.3–0.6 moles;

additional amines: 0–0.8 moles, and preferably 0.2–0.5 moles.

In all cases the final products should have an amine number (of the sum of all components carrying basic groups) of at least 35 mg KOH/g, and preferably of from about 40 to 120 mg KOH/g, with at least 30 mole-% of the basic components having an oxazolidine structure. The products prepared according to the invention, surprisingly, show an essentially improved solubility over the binders of the prior art. Thus, satisfactory dilutability with water is obtained with a lower quantity of neutralizing agent in comparison to prior art binders.

The hydroxy or ring functional compounds used according to the invention and their preparation are disclosed in the prior art. The following Table A sets forth the formulas of various types of compounds which can be employed according to this invention. The references noted in Table A describe the preparation of the compounds.

TABLE A

| General Formulas | Reference Disclosing Compounds |
|---|---|
| (I) 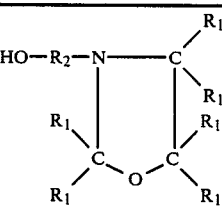 | EP-B 1 00 28 401 |

TABLE A-continued

| General Formulas | Reference Disclosing Compounds |
|---|---|
| (II) ![structure with HO—R_2—N, R_1, R_3, R_4, O] | AT-A 1877/82<br>AT-PS 375 952 |
| (IIa) ![structure with HO—C(R_4)(R_3)—C(R_3)(R_3)—N, R_1, R_3, R_5, O] | AT-A 1877/82<br>AT-PS 375 952 |
| (III) ![structure R_7—N—C—CH_2—OH, R_1, CH_2, O, R_1] | AT-A 2261/82<br>(U.S. Application Serial No. 503,027 filed June 10, 1983) |
| (IV) ![structure HO—R_8—OOC—CH(R_3)—CH_2—N—CH, R_1, CH—R_9, O, R_1] | AT-A 2262/82<br>(U.S. Serial No. 503,207 filed June 10, 1983) |
| (V) ![structure R_10—N, R_3, R_3, R_1, R_3, R_9, O, R_1] | AT-A 4035/82<br>AT-PS 375 946<br>(U.S. Application Serial No. 549,328 filed Nov. 7, 1983) |
| (VI) ![structure R_7—N, R_3, R_3, R_1, R_3, R_9, O, R_1] | AT-A 4035/82<br>AT-PS 375 946<br>(U.S. Application Serial No. 549,328 filed Nov. 7, 1983) |
| (VII) ![structure R_11—N, R_3, R_3, R_1, R_3, R_4, O, R_1] | AT-A 4035/82<br>AT-PS 375 946<br>(U.S. Application Serial No. 549,328 filed Nov. 7, 1983) | wherein $R_1$ is H or a straight chain or branched alkyl radical with 1–4 C-atoms or an OH- or alkyl-O- substituted aryl radical, or the two $R_1$'s are jointly a ring-forming alkylene radical where the ring can be substituted with alkyl, aryl, or alkoxy radicals, $R_2$ is a straight-chain or branched or cyclic alkylene radical with 2–12 C-atoms, $R_3$ is H or $CH_3$—, $R_4$ is a saturated or unsaturated aliphatic, cycloaliphatic or aromatic hydrocarbon radical which may contain ether or ester groups, $R_5$ is the same as $R_3$ or an alkyl radical with more than 1 C-atom or a phenyl radical, $R_6$ is H or a straight-chain or branched or cyclic alkyl radical with 2–12 C-atoms which may carry hydroxy groups, $R_7$ is the moiety remaining of an acrylic or methacrylic monomer, monofunctional with regard to the double bond, after reaction of the active H-atom bonded to the nitrogen, $R_8$ is a straight-chain or branched alkylene or polyalkylene ether radical, $R_9$ is H or an alkyl or phenyl radical, $R_{10}$ is an alkyl radical with 1–4 C-atoms, and $R_{11}$ is a straight-chain or branched alkyl radical with from 2 to 18 C-atoms, an aralkyl radical or a tertiary amino group carrying the above-mentioned groups.

[The term "oxazolidine compounds" as used herein is understood to include the 5-membered compounds, and to the extent their formation is possible the corresponding 6-membered compounds. According to the common nomenclature, these 6-membered compounds are perhydro-1,3-oxazines.]

Suitable monocarboxy compounds which can be employed according to the invention are straight-chain or branched monocarboxylic acids, particularly those with more than 5 C-atoms in the main chain. Such acids, besides serving their function in the processing technique, serve to modify the paint and film properties of the binders of the invention. Specifically, the monocarboxy compounds can be the synthetic or natural long-chain fatty acids including alkane carboxylic acids, such as n-hexanoic carboxylic acid, isooctanoic or isononanaoic acid; oil fatty acids such as linseed oil fatty acid, soya oil fatty acid, conconut oil fatty acid, tall oil fatty acid, dehydrated castor oil fatty acid, and the like. Optionally, aromatic monocarboxylic acids, such as benzoic acid, or methacrylic acid can be co-employed with the fatty acids. Other suitable monocarboxy compounds are the semiesters of dicarboxylic acids obtained by reacting a dicarboxylic acid anhydride with a monoalcohol, such as the semiesters of maleic acid, the phthalic acids, succinic acid and their homologues, with butanol, its isomers and higher homologues thereof. Further suitable monocarboxylic compounds are the semiesters of hydroxyoxazolidines as disclosed in EP-B1- 00 28 402, or the reaction products of ring functional oxazolidines with dicarboxylic acid anhydrides as disclosed in AT-PS No. 375 946.

The preferred epoxy resins which can be utilized herein are the known di- and poly-epoxy compounds obtained through reaction of phenols or phenol novolaks with epichlorohydrin. Also, epoxy resins based on aliphatic alcohols or copolymers carrying glycidyl groups are suitable as starting materials for the process of the invention. A large number of such epoxy compounds are known in the literature. The most popular epoxy groups containing raw materials having in common the general formula

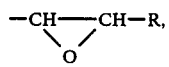

R=H, alkyl are glycidyl ethers of phenols, particularly of 4,4'-bis-hydroxyphenyl)propane (Bisphenol A). Similarly well known are the glycidyl ethers of phenol formaldehyde condensates of the Novolak type, glycidyl esters of aliphatic, aromatic or cycloaliphatic mono- or polycarboxylic acids, glycidyl ethers of aliphatic or cycloaliphatic diols or polyols, copolymers of glycidyl(meth)acrylate or epoxidation products of aliphatic or cycloaliphatic di- or polyolefins. An elaborate survey of this class of raw materials can be found in A. M. Paquin "Epoxidverbindungen and Epoxyharze," Springer 1958.

The binders are prepared by joint reaction of the epoxy resins with the oxazolidine compounds, the monocarboxy compounds and, if desired, amines at a temperature of from about 65° to 90° C. The weight ratios of the components are chosen in order that the mole-sum of the epoxy groups corresponds to the mole-sum of all epoxy reactive groups, as defined above. The ratio between the oxazolidine compounds and the monocarboxy compounds will lie between about 1:5 and 1:2. With proper selection of the weight ratios as set forth herein, there will be no formation of quarternary ammonium ions. In a special embodiment the process is carried out whereby an oxazolidine compound and a dicarboxylic acid anhydride, in an adequate molar excess, is reacted with the epoxy resin. A monocarboxy compound carrying oxazolidine groups will form in situ in addition to a quantity of oxazolidine compound for the reaction with the epoxy resin. Advantageously, the obtained products are hydrolyzed at about 50° to 80° C. in the presence of catalytic amounts of formic acid or acetic acid.

The binders can be milled in known manner with pigments and are thereafter diluted for use in electrodeposition, preferably with deionized water, upon neutralization with inorganic or organic acids, at a pH-value of between 4 and 7 to a solids content of between 5 and 20%. The binders prepared according to the invention have excellent dilutability with water, even with a low degree of neutralization.

The use of additives and the conditions for the deposition on a substrate wired as cathode are known to one skilled in the art and need no further explanation. The products of the invention are specially suited as mill base resins for pigments and extenders. The methods for their preparation are again known to one skilled in the art.

The following examples will illustrate the invention without limiting its scope. Parts of percentages, unless otherwise stated, are by weight. All figures given in the tables refer to weights.

The following abbreviations are used in the examples:

| | |
|---|---|
| MOLA | monoethanolamine |
| MPA | monopropanolamine |
| MIPA | monoisopropanolamine |
| AEPD | 2-amino-2-ethyl-propandiol-1,3 |
| ETOLA | ethylethanolamine |
| BA | n-butylamine |
| DEAPA | diethylaminopropylamine |
| DMAPA | dimethylaminopropylamine |
| DOLA | diethanolamine |
| DIPA | diisopropanolamine |
| DEA | diethylamine |
| CE | glycidylester of $C_9$–$C_{11}$ monocarboxylic acids |
| STO | styrene oxide |
| AGE | allylglycidylether |
| HEA | hydroxyethylacrylate |
| BUAC | butylacrylate |
| EHAC | 2-ethylhexylacrylate |
| MIBK | methylisobutylketone |
| FA | paraformaldehyde, 91% |
| BZA | benzaldehyde |
| ANA | anis aldehyde (4-methoxy-benzaldehyde) |
| EPH I | epoxy resin based on Bisphenol A epoxy equivalent ca. 200 |
| EPH II | epoxy resin based on Bisphenol A |

-continued

| | |
|---|---|
| | epoxy equivalent ca. 500 |
| EPH III | epoxy resin based on a phenolnovolak, epoxy equivalent ca. 190 |
| MCV 1 | semiester of phthalic acid anhydride and n-butanol |
| MCV 2 | semiester of maleic acid anhydride and 2-ethylhexanol |
| MCV 3 | semiester of tetrahydrophthalic acid anhydride and hydroxyoxazolidine Preparation A 1 |
| MCV 4 | semiester of maleic acid anhydride and isobutanol |
| MCV 5 | modified carboxylic acid of phthalic acid anhydride and oxazolidine compound Preparation A 5(+) |
| MCV 6 | isonanoic acid |
| MCV 7 | talloil fatty acid |
| MCV 8 | modified carboxylic acid of tetra-hydrophthalic acid anhydride with oxazolidine compound A 9(++) |

(+)Prepared according to EP-A2-96768
(++)Prepared according to AT-PS 375 946

Preparation of the Oxazolidine Compounds Used in the Examples

The compounds are prepared from the reactants listed in Table I under the conditions set forth therein. The last column of Table I refers to the group of compounds set forth in Table A.

TABLE I

| Preparation | Amine | (Meth) Acrylate | Monoepoxide | Reac. Cond. h/°C. | Carbonyl Compound | Literature Reference | General Formula |
|---|---|---|---|---|---|---|---|
| A1 | 133 DIPA | — | — | — | 33 FA | EP-B 1 28 401 | (I) |
| A2 | 61 MOLA | — | 240 CE | 3/130 | 106 BZA | AT-PS 375 952 | (II) |
| A3 | 75 MPA | — | 120 STO | 2/100 | 33 FA | AT-PS 375 952 | (II) (6-Ring) |
| A4 | 75 MIPA | 116 HEA | — | 2/80 | 100 MIBK | AT-A 2262/82 | (IV) |
| A5 | 119 AEPD | 126 BUAC | — | 2/100 | 136 ANA | AT-A 2261/82 | (III) |
| A6 | 89 ETOLA | — | — | — | 33 FA | AT-PS 375 946 | (V) |
| A7 | 75 MIPA | 184 EHAC | — | 1/70 | 33 FA | AT-PS 375 946 | (VI) |
| A8 | 73 BA | — | 114 AGE | 2/120 | 98 CHX | AT-PS 375 946 | (VII) |
| A9 | 130 DEAPA | — | 240 CE | 1/100 | 33 FA | AT-PS 375 946 | (VII) |

EXAMPLES 1-13

The binders, in the weight ratios listed in Table II, are reacted at from 70° to 80° C. in a suitable reaction vessel, optionally in the presence of an inert solvent, until an acid value of less than 3 mg KOHg is attained. In order to safeguard a reaction of all free epoxy groups, the batch is reacted further under the conditions set forth in Table II.

TABLE II

| | Epoxy Compound | | Monocarboxy Comp. | | Oxazolidine Comp. | | Amine | | Post Reactn. Condition |
|---|---|---|---|---|---|---|---|---|---|
| Ex. | Quantity | Val | Quantity | Val | Quantity | Val | Quantity | Val | h/°C. |
| 1 | 200 EPH I | 1.0 | 289 MCV 1 | 1.3 | 116 A 1 | 0.8 | 22 DEA | 0.6 | 2/85 |
| | 380 EPH III | 2.0 | | | | | 31 DMAPA | 0.6 | |
| 2 | 1400 EPH II | 2.8 | 420 MCV 7 | 1.5 | 233 A 2 | 0.6 | 51 DEA | 0.7 | 2/95 |
| 3 | 750 EPH II | 1.5 | 172 MCV 4 | 1.0 | 166 A 3 | 0.8 | 65 DEAPA | 1.0 | 2/80 |
| | 247 EPH III | 1.3 | | | | | | | |
| 4 | 570 EPH III | 3.0 | 274 MCV 2 | 1.2 | 273 A 4 | 1.0 | 52 DBA | 0.4 | 2/85 |
| | | | | | | | 20 DMAPA | 0.4 | |
| 5 | 180 EPH I | 0.9 | 460 MCV 5 | 0.9 | 218 A 5 | 0.6 | 53 DOLA | 0.5 | 2/85 |
| | 550 EPH II | 1.1 | | | | | 52 DEAPA | 0.8 | |
| | 152 EPH III | 0.8 | | | | | | | |
| 6 | 480 EPH I | 2.4 | 168 MCV 6 | 1.0 | 61 A 6 | | 58 DEA | 0.8 | 1/80 |
| 7 | 500 EPH II | 1.0 | 149 MCV 3 | 0.5 | 271 A 7 | 1.0 | 22 DEA | 0.3 | 2/85 |
| | 342 EPH III | 1.8 | 112 MCV 7 | 0.4 | | | 39 DEAPA | 0.6 | |
| 8 | 1200 EPH II | 2.4 | 202 MCV 6 | 1.2 | 160 A 8 | 0.6 | 31 DMAPA | 0.6 | 1/85 |
| 9 | 300 EPH I | 1.5 | 224 MCV 4 | 1.3 | 153 A 9 | 0.4 | 29 DEA | 0.4 | 2/80 |
| | 247 EPH III | 1.3 | | | | | 93 DIPA | 0.7 | |
| 10 | 500 EPH II | 1.3 | 119 MCV 3 | 0.4 | 325 A 7 | 1.2 | 22 DEA | 0.3 | 2/85 |
| | 342 EPH III | 1.8 | 84 MCV 7 | 0.3 | | | 39 DEAPA | 0.6 | |
| 11 | 1250 EPH II | 2.5 | 84 MCV 6 | 0.5 | 267 A 8 | 1.0 | 65 DEAPA | 1.0 | 3/80 |
| 12 | 1250 EPH II | 2.5 | 534 MCV 8 | 1.0 | 382 A 9 | 1.0 | — | — | 2/80 |
| | | | 84 MCV 6 | 0.5 | | | | | |
| 13 | 200 EPH I | 3.0 | 274 MCV 2 | 1.2 | 261 A 1 | 1.8 | — | — | 3/85 |
| | 380 EPH III | | | | | | | | |

Table III lists the specifications of the products obtained according to Examples 1-13.

TABLE III

| Ex | Amine Value mg KOH/g | Ratio A:MCV (VAL) | Ratio A:EPH (VAL) | Ratio MCV:EPH (VAL) | Neutralization mMole acid/100 g | Resin Solids pH-value |
|---|---|---|---|---|---|---|
| 1 | 92 | 0.62 | 0.27 | 0.43 | 25 | 7.1 |
| 2 | 35 | 0.40 | 0.21 | 0.54 | 35 | 5.0 |
| 3 | 72 | 0.80 | 0.29 | 0.36 | 40 | 6.1 |
| 4 | 85 | 0.83 | 0.33 | 0.40 | 30 | 6.8 |
| 5 | 94 | 0.67 | 0.21 | 0.32 | 35 | 6.7 |
| 6 | 102 | 0.60 | 0.25 | 0.42 | 40 | 6.3 |

TABLE III-continued

| Ex | Amine Value mg KOH/g | Ratio A:MCV (VAL) | Ratio A:EPH (VAL) | Ratio MCV:EPH (VAL) | Neutralization mMole acid/100 g | Resin Solids pH-value |
| --- | --- | --- | --- | --- | --- | --- |
| 7 | 94 | 1.11 | 0.36 | 0.32 | 15 | 7.6 |
| 8 | 42 | 0.50 | 0.25 | 0.50 | 35 | 5.0 |
| 9 | 102 | 0.31 | 0.14 | 0.46 | 25 | 6.9 |
| 10 | 98 | 1.71 | 0.39 | 0.23 | 10 | 8.3 |
| 11 | 67 | 2.0 | 0.40 | 0.20 | 15 | 7.9 |
| 12 | 100 | 0.67 | 0.40 | 0.60 | 40 | 7.3 |
| 13 | 90 | 1.50 | 0.60 | 0.40 | 35 | 6.1 |

COMPARISON EXAMPLE

According to the composition of Example 7, 500 parts of EPH II and 342 parts of EPH III are reacted at 75° to 80° C. with 149 parts of MCV 3, 112 parts of MCV 7, 22 parts of DEA, 39 parts of DEAPA and 250 parts of a secondary amine (prepared from MIPA and EHAC, however, without ring formation with FA, as is carried out in preparing oxazolidine compound A 7), in a 65% solution in ethylene glycol monoethylether, until an acid value of below 3 mg KOH/g is reached.

The resin solution so obtained requires 35 mMole of acetic acid/100 g of resin solids to show satisfactory dilutability with water. The pH-value of a 10% aqueous solution is 5.2. In comparison, the corresponding product prepared according to the invention requires 15 mMoles of acetic acid/100 g of resin solids at a pH-value of 7.6 (see Table III).

As will be apparent to one skilled in the art, various modifications can be made within the scope of the aforesaid description. Such modifications being within the ability of one skilled in the art form a part of the present invention and are embraced by the appended claims.

It is claimed:

1. Process for producing cationic epoxy resins carrying oxazolidine groups suitable as paint binders characterized in that the epoxy resin is reacted at from about 65°–90° C. with a hydroxy functional oxazolidine compound or with an oxazolidine compound carrying in the ring the structure

wherein R is H or an alkyl or aryl radical and is free of alcoholic hydroxy groups in the presence of a monocarboxy compound, the weight ratio between the oxazolidine compound and monocarboxy compound being between about 1:5 and 2:1, the mole-sum of the epoxy reactive groups substantially corresponding to the mole-sum of the epoxy groups of the epoxy resin, and at least 30% of the basic components having an oxazolidine structure with an amine number of at least 35 mg KOH/g.

2. The process according to claim 1 wherein the amine number is from about 40 to 120 mg KOH/g.

3. The process according to claim 1 wherein an amine compound is present during the said reaction.

4. The process according to claim 1 wherein, calculated on 1 epoxy equivalent, 0.1 to 0.8 mole of oxazolidine compound, 0.2 to 0.8 mole of monocarboxy compound and 0 to 0.8 mole of an amine compound are used.

5. The process according to claim 4 wherein the oxazolidine compound is present in an amount of from 0.2 to 0.5 mole, and the monocarboxy compound is present in an amount of from 0.3 to 0.6 mole calculated on 1 epoxy equivalent.

6. The process according to claim 1 wherein the monocarboxy compound is a straight-chain or branched monocarboxylic acid carrying more than 5 C-atoms in the main chain; a semiester of a dicarboxylic acid and a mono-alcohol with more than 3 C-atoms or a hydroxyoxazolidine; a reaction product of a ring-functional oxazolidine with dicarboxylic acid anhydrides, or a reaction product of a ring-functional oxazolidine with methacrylic acid.

7. The process according to claim 1 wherein the oxazolidine group carrying monocarboxy compound is prepared in situ in the presence of the epoxy resin by reacting the corresponding molar quantities of an oxazolidine compound and a dicarboxylic acid anhydride.

8. Cationic epoxy resins carrying oxazolidine groups suitable as paint binders comprising the reaction product of an epoxy resin with a hydroxy functional oxazolidine compound or with an oxazolidine compound carrying in the ring the structure

wherein R is H or an alkyl or aryl radical and is free of alcoholic hydroxy groups in the presence of a monocarboxy compound, said reaction being carried out at a temperature of from about 65°–90° C., and the weight ratio between the oxazolidine compound and monocarboxy compound being between about 1:5 and 2:1, the mole-sum of the epoxy reactive groups correspondging to the mole-sum of the epoxy groups of the epoxy resin, and at least 30% of the basic components having an oxazolidine structure with an amine number of at least 35 mg KOH/g.

9. The cationic epoxy resins according to claim 8 wherein the amine number is from about 40 to 120 mg KOH/g.

10. The cationic epoxy resins according to claim 8 wherein an amine compound is present during the said reaction.

11. The cationic epoxy resins according to claim 8 wherein, calculated on 1 epoxy equivalent, 0.1 to 0.8 mole of oxazolidine compound, 0.2 to 0.8 mole of monocarboxy compound and 0 to 0.8 mole of an amine compound are used in the reaction.

12. The cationic epoxy resins according to claim 11 wherein during the reaction the oxazolidine compound is present in an amount of from 0.2 to 0.5 ; mole, and the monocarboxy compound is present in an amount of from 0.3 to 0.6 mole calculated on 1 epoxy equivalent.

13. The cationic epoxy resins according to claim 8 wherein the monocarboxy compound is a straight-chain or branched monocarboxylic acid carrying more than 5 C-atoms in the main chain; a semiester of a dicarboxylic acid and a monoalcohol with more than 3 C-atoms or a hydroxyoxazolidine; a reaction product of a ring-functional oxazolidine with dicarboxylic acid anhydrides, or a reaction product of a ringfunctional oxazolidine with methacrylic acid.

14. The cationic epoxy resins according to claim 8 wherein the oxazolidine group carrying monocarboxy compound is prepared in situ in the presence of the epoxy resin by reacting the corresponding molar quantities of an oxazolidine compound and a dicarboxylic acid anhydride.

* * * * *